United States Patent
Moshe et al.

(10) Patent No.: US 12,010,014 B2
(45) Date of Patent: Jun. 11, 2024

(54) SYSTEM AND A METHOD FOR ROUTING TRAFFIC IN AN MPLS NETWORK

(71) Applicant: DRIVENETS LTD., Raanana (IL)

(72) Inventors: Yuval Moshe, Ra'anana (IL); Tamir Gal, Nofit (IL); Alexander Gelberger, Ashdod (IL); Felix Weinstein, Even Yehuda (IL); Omri Nir, Kfar Saba (IL)

(73) Assignee: DRIVENETS LTD., Raanana (IL)

( * ) Notice: Subject to any disclaimer, the term of this patent is extended or adjusted under 35 U.S.C. 154(b) by 142 days.

(21) Appl. No.: 17/437,211

(22) PCT Filed: Mar. 5, 2020

(86) PCT No.: PCT/IL2020/050262
§ 371 (c)(1),
(2) Date: Sep. 8, 2021

(87) PCT Pub. No.: WO2020/183451
PCT Pub. Date: Sep. 17, 2020

(65) Prior Publication Data
US 2022/0174003 A1 Jun. 2, 2022

Related U.S. Application Data

(60) Provisional application No. 62/816,433, filed on Mar. 11, 2019.

(51) Int. Cl.
*H04L 45/50* (2022.01)

(52) U.S. Cl.
CPC ................... *H04L 45/50* (2013.01)

(58) Field of Classification Search
CPC ...................................................... H04L 45/50
See application file for complete search history.

(56) References Cited

U.S. PATENT DOCUMENTS

| | | |
|---|---|---|
| 2006/0092976 A1 | 5/2006 | Lakshman et al. |
| 2010/0214913 A1 | 8/2010 | Kompella |

(Continued)

FOREIGN PATENT DOCUMENTS

| | | | |
|---|---|---|---|
| CN | 101977143 A | 2/2011 | |
| EP | 3264691 A1 | 1/2018 | |
| EP | 3410654 A1 * | 12/2018 | ......... H04L 12/4641 |

*Primary Examiner* — Donald L Mills
(74) *Attorney, Agent, or Firm* — Browdy and Neimark, PLLC

(57) ABSTRACT

A system and a method are provided for use in an MPLS network, wherein the system comprises at least one routing element configured to share one or more circuits among multiple Intermediate System to Intermediate System (IS-IS) routing protocol instances, wherein each of the multi instances is associated with a unique database, and wherein the at least one routing element comprises a managing entity configured to: manage a plurality of traffic engineering software agents each associated with a respective database, and allocate available resources to respective instances; update at least one of the plurality of databases; and for traffic that is about to be conveyed via a specific instance, determine a neighboring instance through which said traffic will be conveyed, based on information comprised in the database associated with the specific instance through which said traffic will be conveyed.

4 Claims, 1 Drawing Sheet

(56) References Cited

U.S. PATENT DOCUMENTS

| | | | |
|---|---|---|---|
| 2012/0207012 A1* | 8/2012 | Kompella | H04L 45/125 370/216 |
| 2015/0003283 A1* | 1/2015 | Previdi | H04L 45/50 370/254 |
| 2015/0146536 A1* | 5/2015 | Minei | H04L 45/507 370/236 |
| 2020/0153733 A1* | 5/2020 | Chunduri | H04L 45/30 |

* cited by examiner

SYSTEM AND A METHOD FOR ROUTING TRAFFIC IN AN MPLS NETWORK

TECHNICAL FIELD

The present disclosure relates generally to the field of networking, and in particular, to routing of network flows of communications' traffic.

Glossary

BGP—Border Gateway Protocol
CPU—central processing unit
CSPF—Constrained Shortest Path First
ERO—Explicit Route Object
FIB—Forwarding Information Base
FPGA—field-programmable gate array
IETF—Internet Engineering Task Force
IGP—interior gateway protocol
IS-IS—Intermediate System to Intermediate System
LSDB—Link State Database
MI-RTR—Multi-Instance-capable router
MPLS—Multiprotocol Label Switching
MPLS-NH—Multiprotocol Label Switching—Next Hop
PDU—Protocol Data Unit
RFC—Request for Comments
RIB—Route Information Base
RSVP—Resource Reservation Protocol
RTR—Router
SI-RTR—Single Instance capable router
SRLG—Shared Risk Link Group
TE—Traffic Engineering
TED—Traffic Engineering Database
TLV—Type-Length-Value

BACKGROUND

Protocol ISO 10589 is an international standard that was designed to establish connectivity and reachability between end systems and intermediate systems on individual subnetwork. However, this protocol allowed only for one entity to operate in a given circuit.

Next, IETF's RFC 8202, "IS-IS Multi-Instance", defined a mechanism that allows a single router to share one or more circuits among multiple Intermediate System to Intermediate System (IS-IS) routing protocol instances.

The use of multiple instances allows isolation of resources associated with each instance, where routers generate instance-specific adjacencies, while each instance may be configured to support multiple topologies. Each topology is associated with a unique Link State Database (LSDB) and each Protocol Data Unit (PDU) contains a Type-Length-Value (TLV) identifying the instance and the topology (or topologies) to which that PDU belongs.

RFC 8202 discloses an option to configure interfaces in a multiple instances' environment, and it may also be used to handle the aspect of traditional native IPv4, IPv6 routing topology. Yet, there is no solution for handling traffic-engineering requirements of an MPLS network which relies on an IS-IS Multi-Instance as the interior gateway protocol ("IGP"), known as an IS-IS-TE instance, that is used for exchanging routing information between gateways (commonly routers) within an autonomous system (for example, a system of corporate local area networks).

An MI-RTR (a router that supports IS-IS Multi-Instance) is referred to as a "Multi-Instance-capable router". When such a router is part of an MPLS traffic-engineering ("TE") network, it requires support for a traffic-engineering database ("TED") per each IS-IS instance in order to satisfy an MPLS-TE protocol CSPF needs.

Each TED is required to hold a unique topology information pertaining to the relevant IS-IS instance, including routers and interfaces associated with the instance, with all the relevant TE information such as bandwidth availability, admin-groups and SRLG.

An MPLS transport protocol such as RSVP-TE uses a combination of the Constrained Shortest Path First (CSPF) algorithm and Explicit Route Objects (EROS) to determine how would traffic be routed through the network.

The present disclosure seeks to provide a solution which solve the above described hurdles associated with traffic flow monitoring.

SUMMARY

The disclosure may be summarized by referring to the appended claims.

It is an object of the present disclosure to provide a novel network element and a software, operative in communications network that enable monitoring of known traffic flows.

Other objects of the present disclosure will become apparent from the following description.

According to a first embodiment of the present disclosure, there is provided a system for use in an MPLS network, wherein the system comprises at least one routing element configured to share one or more circuits among multiple Intermediate System to Intermediate System (IS-IS) routing protocol instances, wherein each of the multi instances is associated with a unique database, and wherein the at least one routing element comprises a processor configured for carrying out a managing entity functionality comprising:

managing a plurality of traffic engineering software agents each associated with a respective database, and allocate available resources to respective instances;

updating at least one of the plurality of databases; and for traffic that is about to be conveyed via a specific instance, determining a neighboring instance through which that traffic will be conveyed, based on information comprised in the database associated with the specific instance through which the traffic will be conveyed.

According to another aspect of the present invention there is provided a method for use in an MPLS network by a managing entity comprises in a routing element, wherein the routing element is configured to share one or more circuits among multiple Intermediate System to Intermediate System (IS-IS) routing protocol instances, and wherein each of the multi instances is associated with a unique database, the method comprises the steps of:

managing a plurality of traffic engineering software agents each associated with a respective database, and allocate available resources to respective instances;

updating at least one of the plurality of databases; and for traffic that is about to be conveyed via a specific instance, determining a neighboring instance through which that traffic will be conveyed, based on information comprised in the database associated with the specific instance through which the traffic will be conveyed.

According to another embodiment the step of updating at least one of the plurality of databases comprises updating each of the plurality of databases.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps, not all of which are required in all embodiments of the invention.

Figure 1:
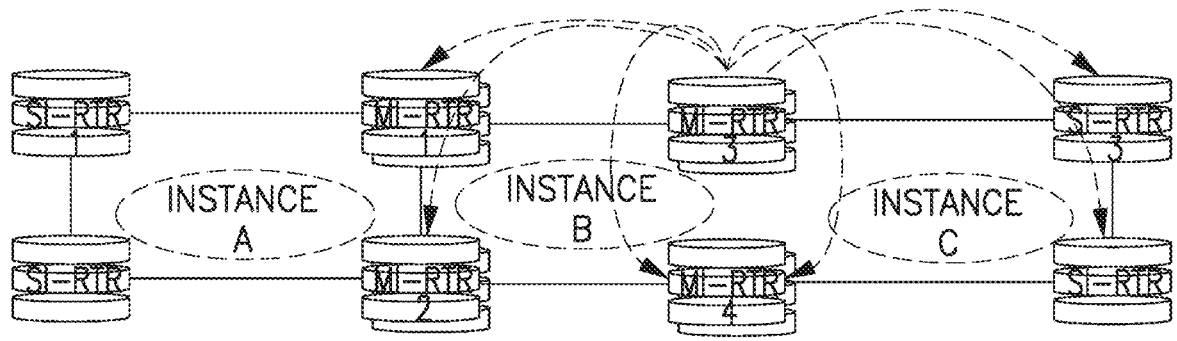
FIG. 1. illustrates a schematic overview of multi-instance TE network topology, construed in accordance with an embodiment of the present invention.

Let us consider the following example illustrated in FIG. 1, in which a communication system is construed in accordance with an embodiment of the present disclosure and operative in an MPLS network. The communication system which is depicted in this figure, comprises a plurality of routers associated with multiple instances (i.e. multi instances capable routers) MI-RTR$_1$ to MI-RTR$_4$ and a plurality of single instances routers (SI-RTR), each associated with a single instance.

The prior art solutions previously adopted by the industry, relied on selecting one of the instances from among the multi instances available, to operate as a fixed instance through which traffic will be conveyed while using a single database associated with that instance.

The present invention provides another solution that relies on a completely different underlying principle. According to an embodiment of the present invention, each of the multi instances is associated with its own database, and the selection is made based on an ad hoc determination as to which of the databases from among the plurality of databases will be used when determining a path along which traffic will be conveyed. Another challenge associated with this solution that needs to be overcome, is, how to manage this plurality of databases, and to allocate resources therebetween. To do that, each database associated with one of the multi instances, is provided with a traffic engineering software agent. A managing entity comprised in the router is configured to update each of the databases, for example updates about changes that occurred to their adjacent neighbors, and to determine which of the neighbors will be used for traffic conveying.

Multiprotocol Label Switching (MPLS) traffic engineering software enables an MPLS backbone to replicate and expand upon the traffic engineering capabilities of Layer 2 networks. Traffic engineering is essential for service provider's and Internet service provider's backbones that support a high transmission capacity in networks that are very resilient. MPLS traffic engineering provides an integrated approach to traffic engineering. With MPLS, traffic engineering capabilities are integrated within Layer 3, which optimizes the routing of IP traffic, given the constraints imposed by the backbone capacity and topology.

The routers' IS-IS level capabilities can be configured globally and/or on a per-interface basis. The interface level parameters may specify the interface's routing level as well as the neighbor capabilities and parameters defining the adjacencies that are established. Typically, when an IS-IS instance is enabled, the router may operate either as a level 1 and/or as a level 2 router with associated databases. The routers run separate shortest path first (SPF) calculations for the level 1 area routing and for the level 2 multi-area routing, in order to create an IS-IS routing table for the IS-IS instance.

As may be seen from this FIG. 1, both MI-RTR$_3$ and MI-RTR$_4$ are associated (e.g. participate in a broadcast circuit) each with instances B and C. There is a plurality of RSVP-TE tunnels that extend between MI-RTR$_3$ and MI-RTR$_4$, where each of these tunnels is associated with a different IS-IS instance.

Resource Reservation Protocol-Traffic Engineering ("RSVP-TE") is an extension of the Resource Reservation Protocol (RSVP) for traffic engineering. It supports the reservation of resources across an IP network. Applications running on IP end systems can use RSVP to indicate to other nodes the nature of the packet streams they want to receive (e.g. bandwidth, jitter, maximum burst, and the like).

RSVP-TE as described in RFC 3209 and RFC 5151 generally allows the establishment of MPLS label switched paths (LSPs), taking into consideration network constraint parameters such as available bandwidth and explicit hops.

In the present example, RSVP-TE protocol is used to establish a tunnel between two end-points (MI-RTR) in the communication network, based on Constrained Shortest Path First (CSPF) information derived from a single IS-IS TE instance.

During operation, the operator of the communication network is able to establish a tunnel which is associated explicitly with a given IS-IS instance, selected from among a plurality of instances supported by the respective MI-RTR.

When establishing a tunnel, the relevant MI-RTR may use the same set of virtual loopback interfaces that are used as RSVP signaling source which serve as the destinations for all local IS-IS instances configured on the respective devices.

An MI-RTR may be configured with multiple instances to support installation of relevant IS-IS routes to a single Route Information Base ("RIB") table. In order to distinguish between the different paths of IS-IS reaching the same destination, each IS-IS instance is preferably provided with a user configured admin-distance preference.

Using the RIB table, an associated processor performs a route selection based on the admin-distance value (a lower value means a higher priority) and the selected route is then introduced to the Forwarding Information Base (FIB) table.

If an MI-RTR is associated with multiple RSVP-TE tunnels targeted to a destination router, where each of the RSVP-TE tunnels is associated with a different IS-IS instance, the RIB table is preferably used by the processor to select one of the RSVP-TE tunnels by implementing admin-distance algorithm.

In case of an MI-RTR acting as a head-end router (i.e. an ingress point to an RSVP-TE tunnel) is used to establish the RSVP-TE tunnels in a dedicate MPLS table, the MI-RTR is used for resolution of recursive protocol next-hop routes such BGP, which in turn may require MPLS reachability to the destination (i.e. BGP Labelled-unicast address-family).

Moreover, when two adjacent MI-RTRs belong to one or more multiple IS-IS-TE instances, a special handling is required for allocating bandwidth on the shared resource interface. An RSVP tunnel may require a certain allocation of bandwidth at an interface for a given IS-IS-TE instance.

Yet, the bandwidth allocation may have to be changed for the very same interface, when another instance associated with that router is about to be used. An MI-RTR may be configured with multiple logical interfaces (sub-interfaces), each for a different IS-IS-TE instance, and using a shared resource calculation in an RSVP in order to enable affecting changes while switching from one instance to another.

The question of RSVP-TE tunnel prioritization across multiple instances may be determined by applying the "first-come-first-served" mechanism, where an RSVP pre-emption mechanism (soft or hard) is used to establish RSVP-TE tunnels based on the IS-IS TED information available.

Figure 2:
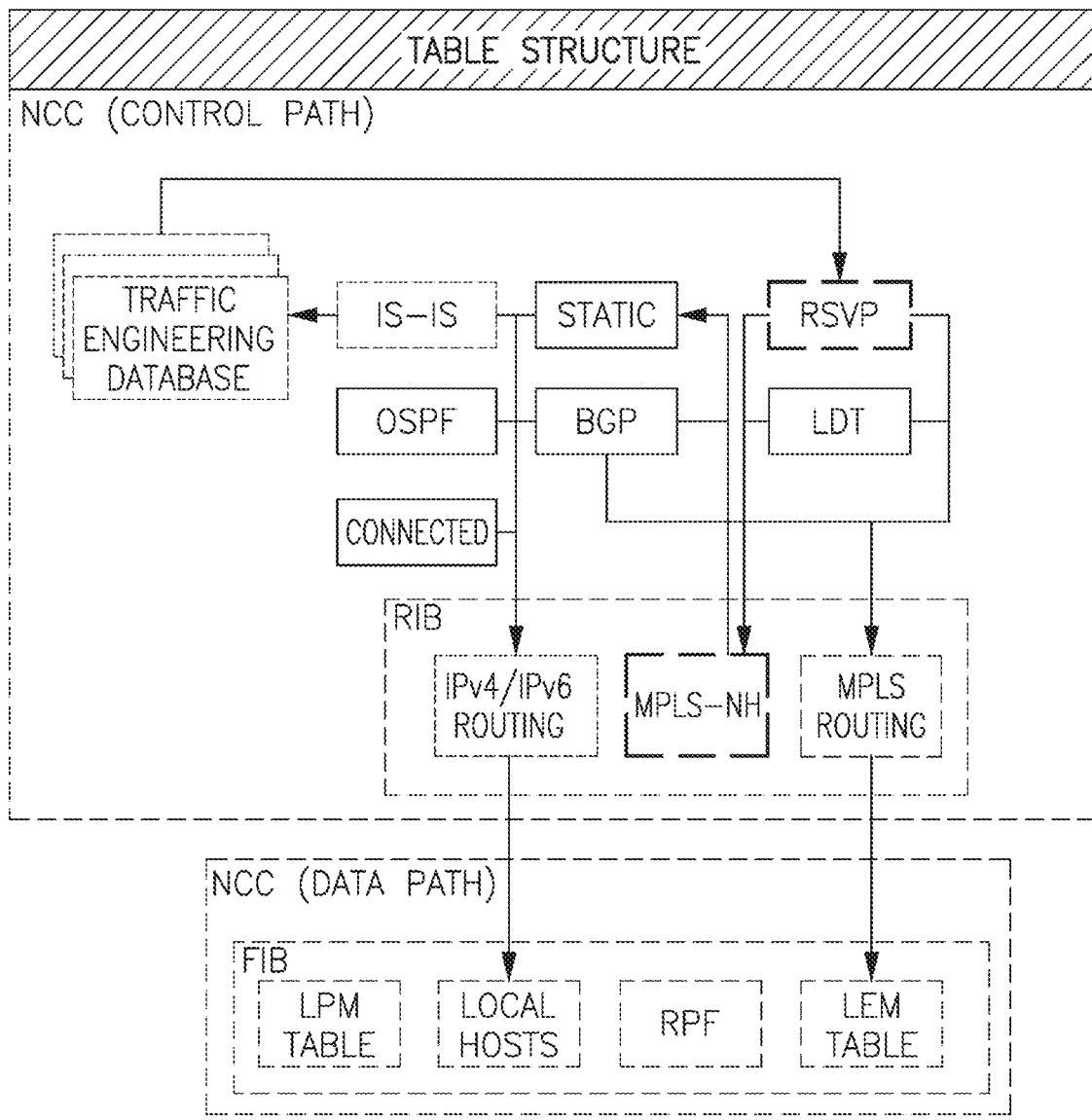
FIG. 2. illustrates a schematic overview of MI-RTR Routing and Forwarding table structure, construed in accordance with another embodiment of the present invention.

FIG. 2 illustrates an example of a schematic overview of MI-RTR Routing and Forwarding table, construed in accordance with another embodiment of the present invention. As may be seen in this example, the table comprises details of an MI-RTR system, where IS-IS is associated with multiple Traffic-engineering databases, and the RSVP is updated with information in the IS-IS TED per instance. The IS-IS Information is preferably included in an IPv4/IPv6 routing table, and the RSVP-TE information (Tunnel resolution) is comprised in an MPLS-NH table.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for use in an MPLS network, said system comprising:
    a) a routing element that shares one or more circuits among multiple Intermediate System to Intermediate System (IS-IS) routing protocol instances;
    b) a plurality of routing protocol instances each of which is associated with a database from among a plurality of databases;
    c) a managing entity that manages plurality of traffic engineering software agents, and dynamically selects a database from among the plurality of databases, to be associated with a traffic engineering software agent from among said plurality of the traffic engineering software agents, wherein said traffic engineering software agent conveys traffic along a path being currently used for conveying traffic, and wherein said selection of a database is made based on an ad hoc selection of a database from among the plurality of databases;
    d) wherein said managing entity updates databases associated with respective routing protocol instances and based on that update, allocates available resources to routing protocol instances via which traffic is being conveyed; and
    e) wherein said managing entity conveys traffic via a specific routing protocol instance, wherein said specific routing protocol instance is associated with the one or more databases currently selected from among the plurality of databases.

2. The system of claim 1, wherein for traffic that is being conveyed via a specific routing protocol instance, said managing entity is further configured to determine a neighboring routing protocol instance through which said traffic will be conveyed, based on information comprised in the database associated with the specific routing protocol instance through which said traffic is being conveyed.

3. A method for use in an MPLS network by a managing entity comprises in a routing element, wherein said routing element is configured to share one or more circuits among multiple Intermediate System to Intermediate System (IS-IS) routing protocol instances, and wherein each of the routing protocol instances is dynamically associated with a database selected from among a plurality of databases, said method comprising the steps of:
    managing a plurality of traffic engineering software agents, and to dynamically select a database from among the plurality of databases, to be associated with a traffic engineering software agent from among said plurality of the traffic engineering software agents, wherein said traffic engineering software agent is used for conveying traffic along a path being currently used for conveying traffic, and wherein said selection of a database is made based on an ad hoc selection of a database from among the plurality of databases,
    updating databases associated with respective routing protocol instances and based on that update, to allocate available resources to routing protocol instances via which traffic is being conveyed; and
    conveying traffic via a specific routing protocol instance, wherein said specific routing protocol instance is associated with the one or more databases currently selected from among the plurality of databases.

4. The method of claim 3, wherein for traffic being conveyed via a specific routing protocol instance, the method comprises determining a neighboring routing protocol instance through which said traffic is being conveyed, based on information comprised in the database associated with the specific routing protocol instance through which said traffic is being conveyed.

\* \* \* \* \*